(12) United States Patent
Sakurai

(10) Patent No.: US 10,054,838 B2
(45) Date of Patent: Aug. 21, 2018

(54) LIGHT CONTROL SYSTEM

(71) Applicant: Santec Corporation, Aichi (JP)

(72) Inventor: Yasuki Sakurai, Aichi (JP)

(73) Assignee: Santec Corporation, Aichi (JP)

( * ) Notice: Subject to any disclaimer, the term of this patent is extended or adjusted under 35 U.S.C. 154(b) by 0 days.

(21) Appl. No.: 15/335,126

(22) Filed: Oct. 26, 2016

(65) Prior Publication Data

US 2017/0315422 A1    Nov. 2, 2017

(30) Foreign Application Priority Data

Apr. 28, 2016    (JP) .................................. 2016-091721

(51) Int. Cl.
| | | |
|---|---|---|
| *G02F 1/29* | (2006.01) | |
| *G02F 1/137* | (2006.01) | |
| *G02F 1/133* | (2006.01) | |
| *G02F 1/313* | (2006.01) | |

(52) U.S. Cl.
CPC .............. *G02F 1/292* (2013.01); *G02F 1/137* (2013.01); *G02F 1/13306* (2013.01); *G02F 1/3131* (2013.01); *G02F 2203/12* (2013.01)

(58) Field of Classification Search
CPC ........... G02F 1/29; G02F 1/31; G02B 26/001; G02B 26/0841; G02B 6/356

USPC ................. 359/272, 254, 263, 318, 320–326
See application file for complete search history.

(56) References Cited

U.S. PATENT DOCUMENTS

| | | | | |
|---|---|---|---|---|
| 7,292,382 | B2 * | 11/2007 | Fujimori | ................. G02F 1/055 |
| | | | | 345/84 |
| 9,163,929 | B2 * | 10/2015 | Lim | ...................... A61B 5/0066 |
| 9,535,241 | B2 * | 1/2017 | Nomura | ................. G02B 21/06 |
| 2004/0155997 | A1 * | 8/2004 | West | ...................... G02F 1/1334 |
| | | | | 349/86 |

FOREIGN PATENT DOCUMENTS

JP    2009-198255 A    9/2009

* cited by examiner

*Primary Examiner* — Mohammed Hasan
(74) *Attorney, Agent, or Firm* — Osha Liang LLP

(57) ABSTRACT

A light control system is provided with a spatial light modulator of a liquid-crystal type, an input unit, and a controller. The input unit is configured to input a light to the spatial light modulator. The controller is configured to cause the spatial light modulator to function as a diffraction grating by electrically controlling the spatial light modulator. The controller is configured to change a path of a diffracted light from the spatial light modulator corresponding to the light input from the input unit by changing a shape of the diffraction grating.

11 Claims, 9 Drawing Sheets

[FIG.1]
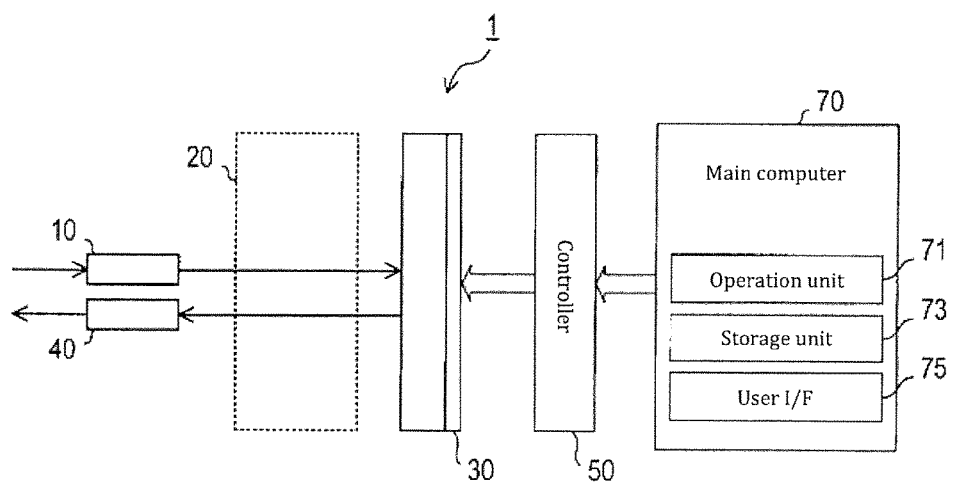
[FIG.2]
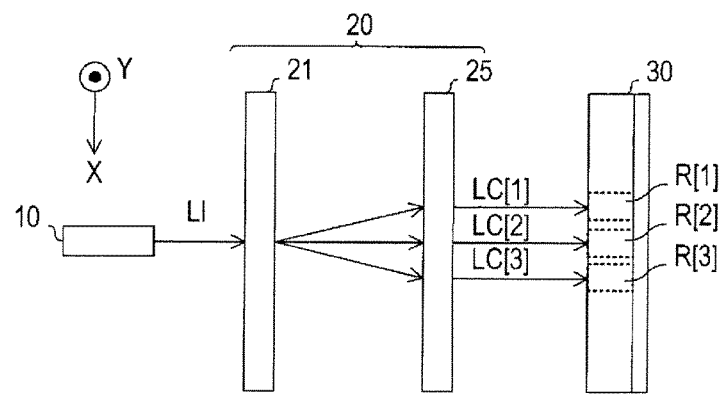

[FIG.3]
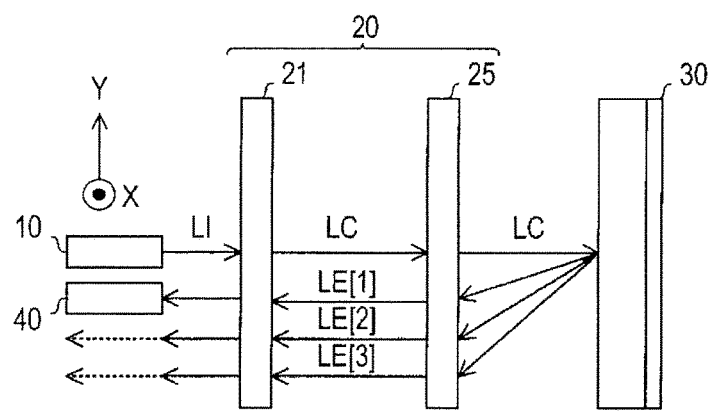
[FIG.4]
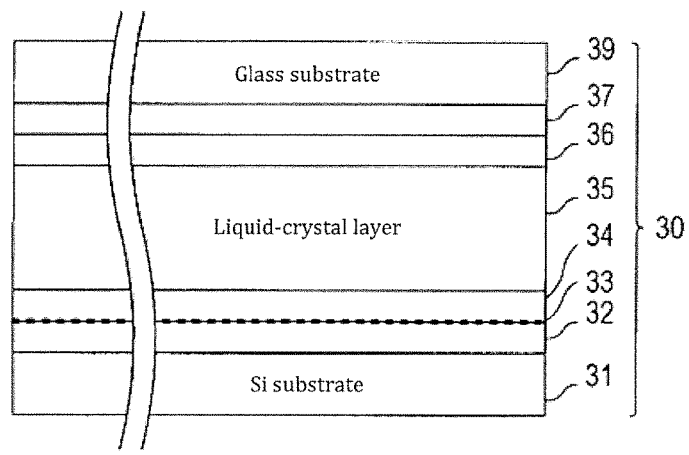

[FIG.5]
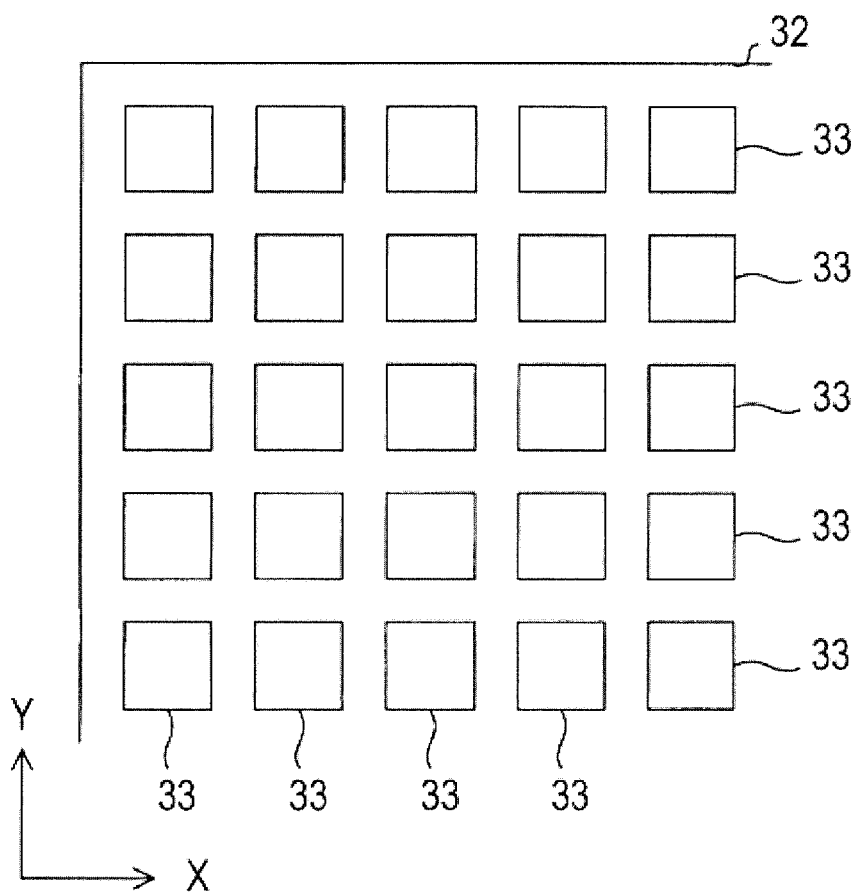

[FIG.6]
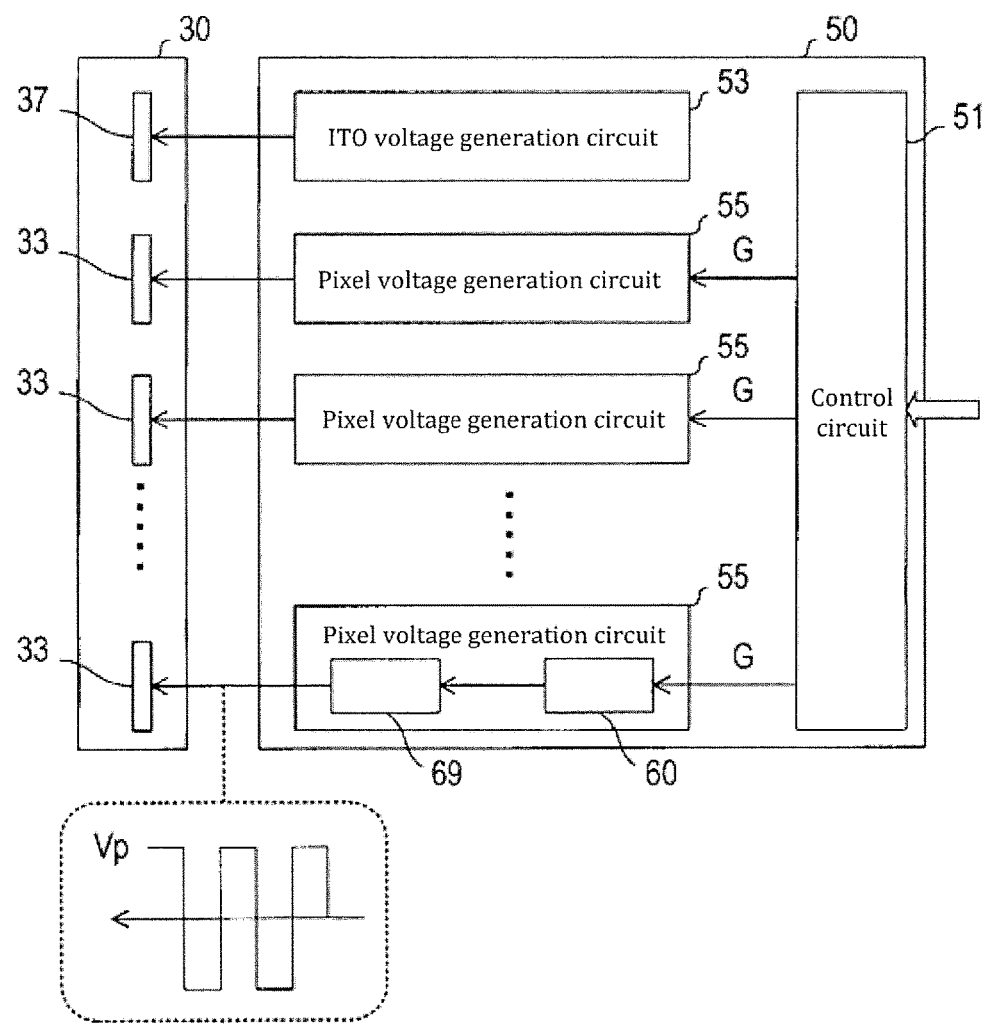

[FIG.7]
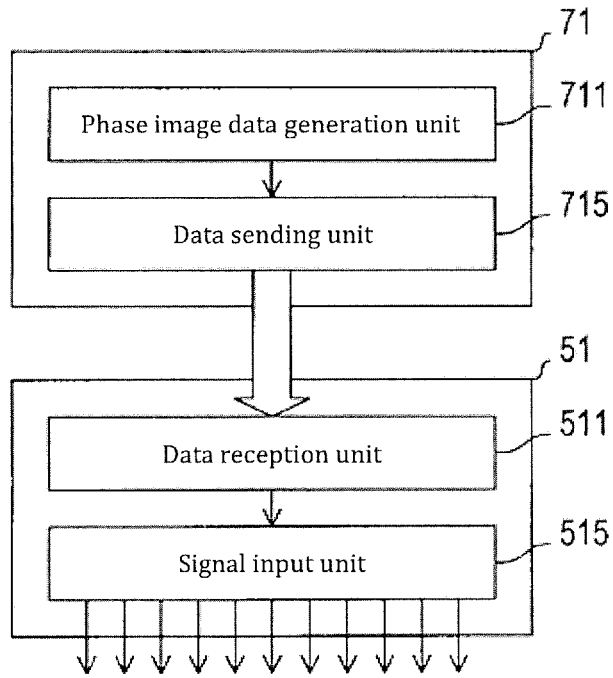
[FIG.8]
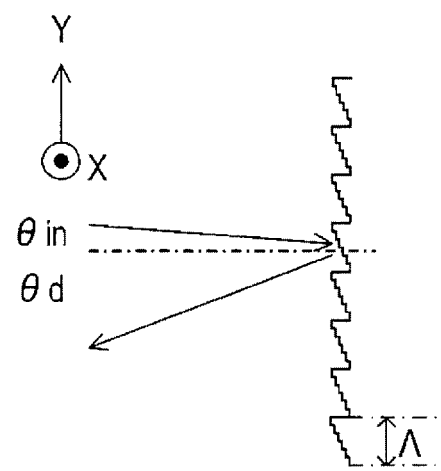

[FIG.9]
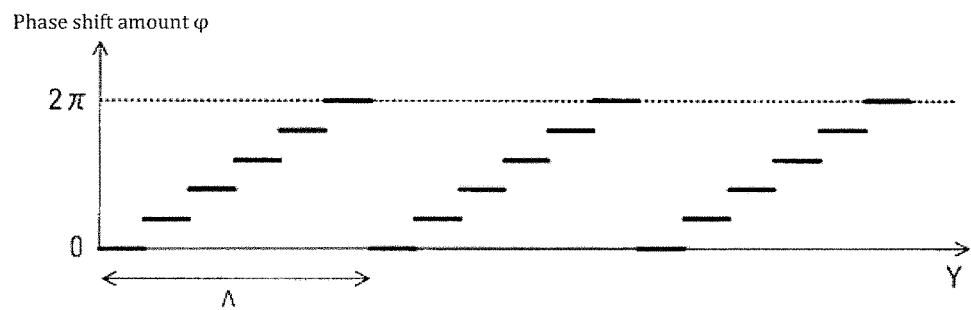
[FIG.10]
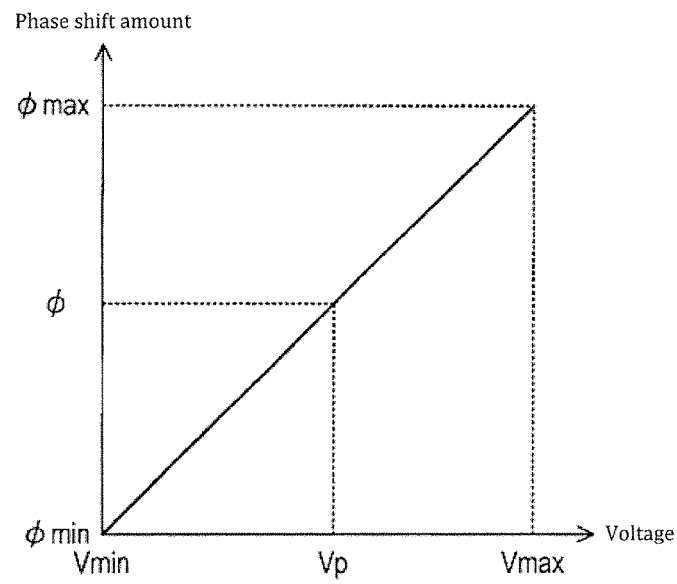

[FIG.11]
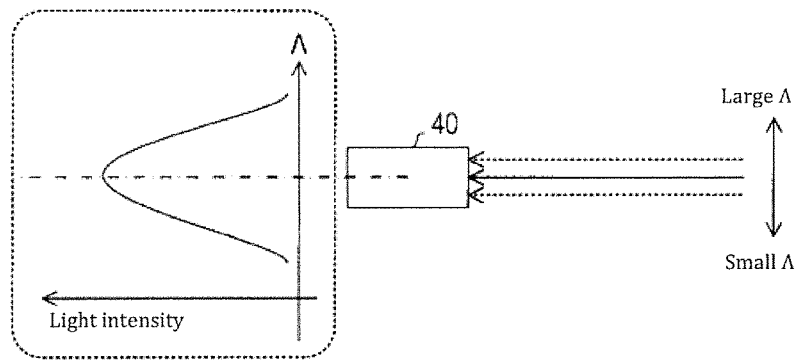
[FIG.12]
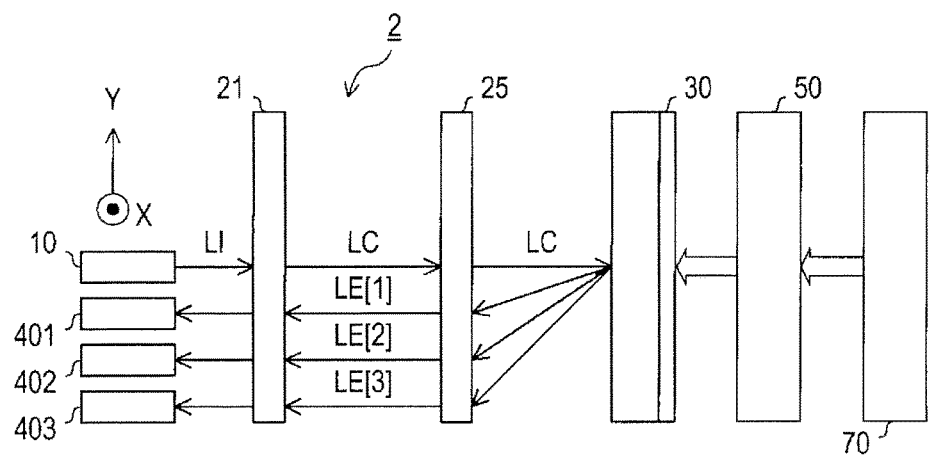

[FIG.13]
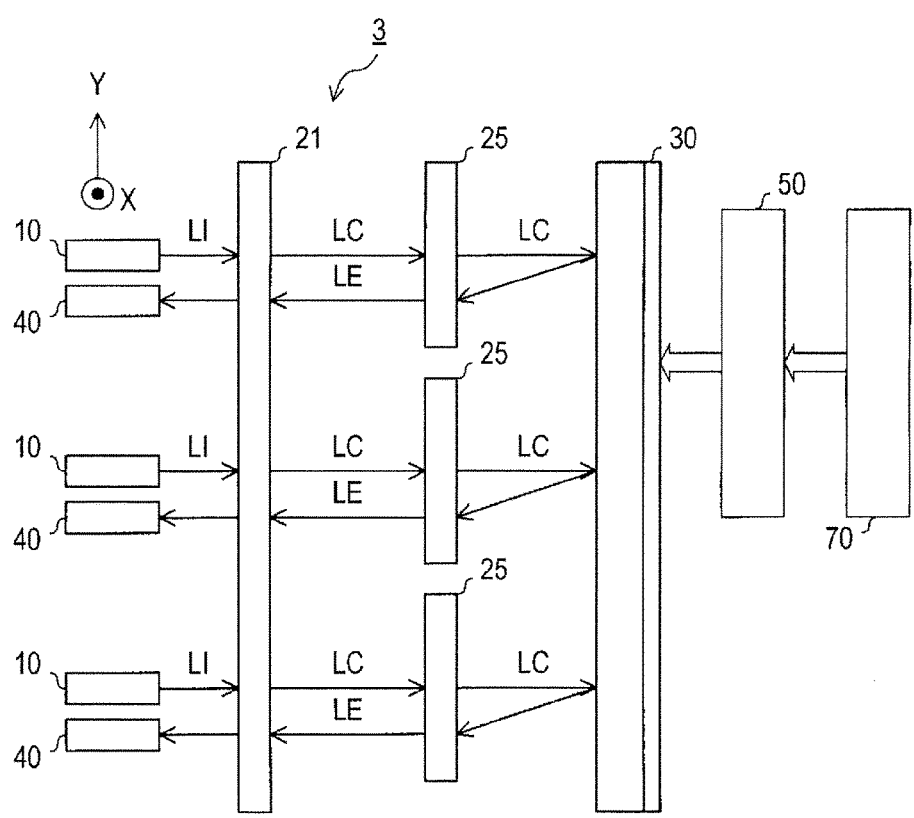

[FIG.14]
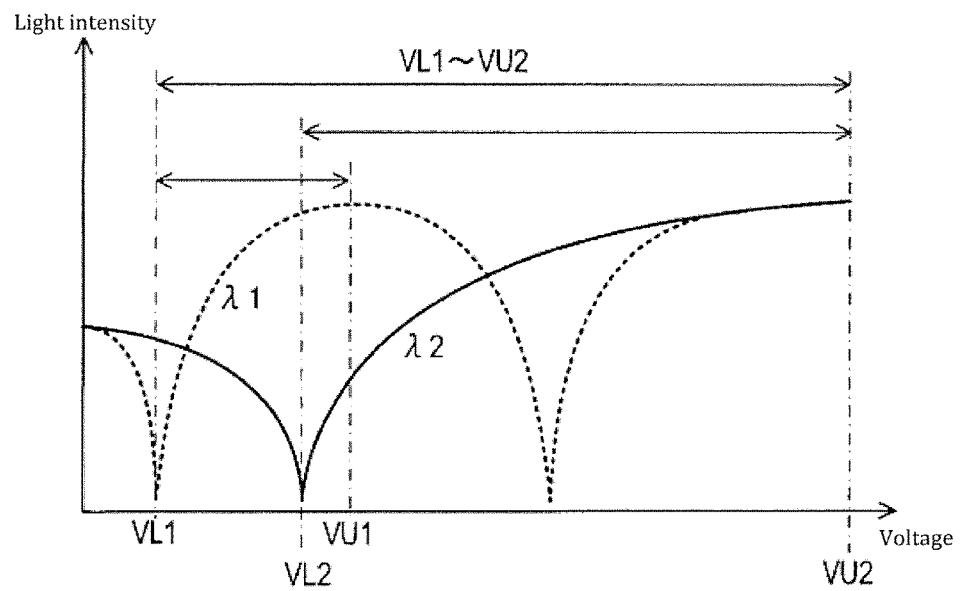

LIGHT CONTROL SYSTEM

FIELD

The present disclosure relates to a light control system.

BACKGROUND

Systems that use a spatial light modulator to modulate a spatial distribution of a phase, an amplitude, an intensity, and the like of a light are conventionally known. Intensity modulation systems that modulate a light intensity by combining a liquid-crystal element and a polarizer are also known (for example, see patent literature 1). According to these intensity modulation systems, the light intensity is controlled by using the liquid-crystal element to control a polarization state of a light output through the polarizer.

CITATION LIST

Patent Literature

[Patent Literature 1] JP 2009-198255 A

SUMMARY

However, in the intensity modulation systems described above, a wavelength dependency between a voltage applied to the liquid crystal and the light output intensity is strong. Because of this, when a frequency band of the input light becomes wide, a need arises of controlling the voltage applied to the liquid crystal over a wide range.

According to the graph illustrated in FIG. 14, concerning a light of a first wavelength $\lambda 1$, by controlling the voltage applied to the liquid crystal in a range of a voltage VL1 to a voltage VU1, an output intensity thereof can be controlled from a minimum value to a maximum value. Concerning a light of a second wavelength $\lambda 2$, by controlling the voltage applied to the liquid crystal in a range of a voltage VL2 to a voltage VU2, an output intensity thereof can be controlled from a minimum value to a maximum value.

However, in a situation of configuring an intensity modulation system corresponding to both the first wavelength $\lambda 1$ and the second wavelength $\lambda 2$, the system needs to be configured so the voltage applied to the liquid crystal can be controlled from the voltage VL1 to the voltage VU2. A voltage range VL1 to VU2 is wider than either of the voltage range VL1 to VU1 relating to the first wavelength $\lambda 1$ and the voltage range VL2 to VU2 relating to the second wavelength $\lambda 2$.

The voltage applied to the liquid crystal is normally controlled via a process of converting a quantized digital value of predetermined gradations into an analog voltage by a DAC. "DAC" signifies "digital/analog converter." Therefore, when an output voltage range of the DAC is set to the voltage range VL1 to VU2 and all the gradations are assigned to this range, output intensities of the first wavelength $\lambda 1$ and the second wavelength $\lambda 2$ come to be respectively controlled by digital values of a limited gradation count corresponding to the voltage range VL1 to VU1 and the voltage range VL2 to VU2.

This signifies that a resolution of an output intensity a light of a wavelength of one portion decreases remarkably compared to lights of other wavelengths. That is, according to the conventional technology, it is difficult to control an output intensity in a high resolution over a wide optical band.

Therefore, according to one aspect of the present disclosure, it is desirable to be able to provide a light control system with little wavelength dependency that can also be applied to intensity modulation.

A light control system according to one aspect of the present disclosure is provided with a spatial light modulator of a liquid-crystal type, an input unit, and a controller. The input unit is configured to input a light to the spatial light modulator. The controller is configured to cause the spatial light modulator to function as a diffraction grating by electrically controlling the spatial light modulator. The controller is configured to change a path of a diffracted light from the spatial light modulator corresponding to the light input from the input unit by changing a shape of the diffraction grating.

According to this light control system, the spatial light modulator of the liquid-crystal type can be made to function as a variable diffraction grating to control an optical path. By control of the optical path, a spatial distribution of a light intensity can be controlled. Moreover, a wavelength dependency between the shape of the diffraction grating and the optical path is sufficiently smaller than a wavelength dependency between a voltage applied to a liquid crystal and a polarization state according to the conventional technology. Therefore, according to one aspect of the present disclosure, a light control system with little wavelength dependency that can also be applied to intensity modulation can be provided.

The diffraction grating can be a multilevel diffraction grating. It may be understood that a blazed diffraction grating is included in one example of the multilevel diffraction grating. In a situation where the diffraction grating is the multilevel diffraction grating, the controller can change the path of the diffracted light by a change of a gradient of the multilevel diffraction grating.

The spatial light modulator can be a spatial light modulator that is provided with a liquid crystal and a plurality of electrodes arranged along a surface of the liquid crystal and is configured to perform phase modulation of the input light from the input unit by applying individual voltages to the liquid crystal from each of the plurality of electrodes.

In this situation, the controller can cause the spatial light modulator to function as the multilevel diffraction grating by controlling voltages input to the plurality of electrodes so a phase shift amount indicates a sawtooth-wave shape in an arrangement direction of the electrodes corresponding to a diffraction direction. The controller can change the gradient of the multilevel diffraction grating by changing a gradient of the phase shift amount.

According to one aspect of the present disclosure, a spatial light modulator of an LCOS type may be provided as the spatial light modulator in the light control system described above.

According to one aspect of the present disclosure, the controller may be configured to adjust an amount of the diffracted light incident to a target by changing the path of the diffracted light. According to one aspect of the present disclosure, the light control system can be provided with an output unit configured to output the diffracted light to outside of the light control system as the target. This output unit is favorably disposed in a position to which a zero-order diffracted light does not become incident. According to such a disposition, an extinction ratio can be improved and a width of an output intensity of the light to outside of the light control system that can be controlled can be widened.

The input unit may be configured to input dispersed light to the spatial light modulator. The input unit may be configured to input non-dispersed light to the spatial light modulator. According to one aspect of the present disclosure, the light control system may be made a configuration provided with a dispersion unit that inputs the input light from the input unit to the spatial light modulator as a spectrum light by dispersing a plurality of wavelength components included in the input light from the input unit. The controller can be configured to control the path of the diffracted light for each wavelength.

The controller may be configured to, by changing respective paths of diffracted lights corresponding to the plurality of wavelength components, adjust respective amounts at which the diffracted lights are incident to the target. According to one aspect of the present disclosure, the light control system can cause light where the intensity of each wavelength component of the input light is uniformly modulated to be made incident to the target by control of the incidence amount by the controller. According to one aspect of the present disclosure, the light control system can also cause light where a change is added to a shape of a power spectrum to be made incident to the target by non-uniform intensity modulation of a plurality of wavelength components.

According to one aspect of the present disclosure, the light control system may be provided with a plurality of output units. The plurality of output units can be configured to output diffracted lights from the spatial light modulator corresponding to the plurality of wavelength components dispersed by the dispersion unit to outside of the light control system. The controller can be configured to control the spatial light modulator so each of the diffracted lights from the spatial light modulator corresponding to the plurality of wavelength components is input to a specified output unit among the plurality of output units. According to the light control system configured in this manner, for example, the plurality of wavelength components included in the input light can be output to outside of the light control system by individual intensity modulation.

According to one aspect of the present disclosure, the light control system may be provided with a plurality of input units and a plurality of output units. The plurality of output units can be configured to output diffracted lights from the spatial light modulator corresponding to input lights from the plurality of input units to outside of the light control system. The controller can be configured to control the spatial light modulator so each of the diffracted lights from the spatial light modulator corresponding to the input lights from the plurality of input units is input to a specified output unit among the plurality of output units.

This light control system can be applied to a system that modulates, in parallel, intensities of lights from a plurality of light sources and outputs the lights. Alternatively, this light control system may be applied to a system that switches an output destination of the lights from the plurality of light sources. The controller can be configured to, by changing respective paths of the diffracted lights, adjust respective amounts at which the diffracted lights are incident to the specified output units.

BRIEF DESCRIPTION OF DRAWINGS

FIG. 1 A diagram representing a schematic configuration of a light control system.

FIG. 2 A diagram representing a disposition of each element in a propagation path of an input light.

FIG. 3 A diagram representing the disposition of each element in the propagation path of the input light.

FIG. 4 A diagram representing a stacked structure of a spatial light modulator.

FIG. 5 A plan view representing a disposition of pixel electrodes in the spatial light modulator.

FIG. 6 A block diagram representing a detailed configuration of a controller.

FIG. 7 A block diagram representing functions had by a control circuit of the controller and a main computer.

FIG. 8 A diagram illustrating a multilevel diffraction grating realized by the spatial light modulator.

FIG. 9 A diagram illustrating a distribution of a phase shift amount that realizes the multilevel diffraction grating.

FIG. 10 A graph representing a correspondence relationship between a voltage applied to the pixel electrodes and the phase shift amount.

FIG. 11 A diagram illustrating a positional change of a diffracted light relative to an output unit.

FIG. 12 A diagram illustrating a configuration of a light control system of a first modified example.

FIG. 13 A diagram illustrating a configuration of a light control system of a second modified example.

FIG. 14 A graph illustrating a relationship between a liquid-crystal voltage and an output intensity in a conventional system.

DESCRIPTION OF EMBODIMENTS

Illustrative embodiments of the present disclosure are described below together with the drawings. A light control system 1 according to one or more embodiments illustrated in FIG. 1 is a system that controls an input light from an input unit 10 according to each wavelength component and outputs the light to outside of the light control system from an output unit 40. This light control system 1 can output only a partial component of the input light to outside of the light control system while adjusting an output intensity thereof. This light control system 1 can adjust a power spectrum of the input light and output the light to outside of the light control system. In this situation, the light control system 1 can function as a variable light source. Therefore, this light control system 1 can be applied to various systems, such as an optical communication system or an illumination system. The variable light source can be utilized in, for example, illumination simulation.

Specifically, the light control system 1 is provided with the input unit 10, an intermediate optical system 20, a spatial light modulator 30, the output unit 40, a controller 50, and a main computer 70. The input unit 10 is configured to input the light to be controlled to the intermediate optical system 20. The input unit 10 may be a light source, optical fibers that transmit a light from a light source, an optical system that freely shapes and guides to the intermediate optical system 20 a light from a light source, or a combination thereof.

The intermediate optical system 20 is configured to disperse the input light from the input unit 10 into a plurality of wavelength components and input the spectrum light to the spatial light modulator 30. For example, as illustrated in FIG. 2, the intermediate optical system 20 can be provided with a diffraction grating 21 and an aspherical lens 25.

The diffraction grating 21 functions as a spectral element and disperses the input light from the input unit 10 into the plurality of wavelength components. The aspherical lens 25 collimates the light separated according to wavelength component input from the diffraction grating 21 and irradiates each wavelength component to a different region of the spatial light modulator 30.

FIG. 2 conceptually illustrates an input light LI from the input unit 10 being separated by the diffraction grating 21 into lights LC[1], LC[2], and LC[3] of components with different wavelengths and becoming incident to the spatial light modulator 30 through the aspherical lens 25.

The input light LI is diffracted by the diffraction grating 21 in one specified direction of when an XY plane parallel to a surface of the spatial light modulator 30 is defined—an X-axis direction according to FIG. 2 and FIG. 3. By this, the plurality of wavelength components included in the input light LI separates in the X-axis direction.

While details are described below, the spatial light modulator 30 according to one or more embodiments functions as a multilevel diffraction grating (see FIG. 8). Therefore, the lights LC[1], LC[2], and LC[3] of the above components are diffracted in a Y-axis direction that is orthogonal to the X-axis direction by the spatial light modulator 30. The reference sign "LC" in FIG. 3 may be understood to indicate the lights LC[1], LC[2], and LC[3].

The light control system 1 according to one or more embodiments controls a path of the light propagated from the input unit 10 to the output unit 40 individually for each wavelength component by controlling, in relation to the Y axis, paths of diffracted lights LE[1], LE[2], and LE[3] for each wavelength component from the spatial light modulator 30 corresponding to the lights LC[1], LC[2], and LC[3]. By this control, the output intensity of the light output to outside of the light control system from the output unit 40 is controlled for each wavelength component.

The spatial light modulator 30 is a liquid-crystal-type spatial light modulator and is specifically an LCOS-type spatial light modulator. The spatial light modulator 30 used in one or more embodiments may be understood as having an internal structure similar to a known LCOS-type spatial light modulator 30.

As illustrated in FIG. 4, this spatial light modulator 30 is provided with an address unit 32 where a plurality of pixel electrodes 33 is two-dimensionally arranged as a CMOS back plane on a silicon (Si) substrate 31. The spatial light modulator 30 is made to be a configuration where an orientation layer 34, a liquid-crystal layer 35, an orientation layer 36, an ITO transparent electrode 37, and a glass substrate 39 are stacked on this address unit 32.

The plurality of pixel electrodes 33 functions as reflective electrodes and is configured to reflect the input light arriving from the input unit 10 through the glass substrate 39, the ITO transparent electrode 37, the orientation layer 36, the liquid-crystal layer 35, and the orientation layer 34. The reflected light is propagated to the intermediate optical system 20 and the output unit 40 through the orientation layer 34, the liquid-crystal layer 35, the orientation layer 36, the ITO transparent electrode 37, and the glass substrate 39.

As illustrated in FIG. 5, this plurality of pixel electrodes 33 is two-dimensionally disposed in an XY direction along a surface of the address unit 32 parallel to a surface of the liquid-crystal layer 35. Individual AC drive signals are input from the controller 50 to each pixel electrode 33. These AC drive signals are alternating-current (AC) voltage signals and are specifically square wave signals indicating an amplitude voltage Vp corresponding to a target phase shift amount φ (see FIG. 6). Hereinbelow, the amplitude voltage Vp of the AC drive signals input to each pixel electrode 33 is expressed as "pixel voltage Vp."

The ITO transparent electrode 37 is disposed opposing the plurality of pixel electrodes 33 interposing the orientation layer 36, the liquid-crystal layer 35, and the orientation layer 34 as a common electrode with the plurality of pixel electrodes 33. A square wave signal indicating a constant amplitude voltage Vi that is an alternating-current voltage signal synchronized with the AC drive signals to the pixel electrodes 33 is input as an AC drive signal from the controller 50 to the ITO transparent electrode 37. Hereinbelow, the amplitude voltage Vi of the AC drive signal input to the ITO transparent electrode 37 is expressed as "ITO voltage Vi."

In the liquid-crystal layer 35, a voltage corresponding to a difference between the ITO voltage Vi and the pixel voltage Vp is applied to each pixel by input of the AC drive signals from the controller 50 synchronized with the ITO transparent electrode 37 and the pixel electrodes 33. By this application, a phase shift according to this applied voltage arises in lights that pass through pixel regions corresponding to each pixel electrode 33 in the liquid-crystal layer 35.

As illustrated in FIG. 6, the controller 50 is provided with a control circuit 51, an ITO voltage generation circuit 53, and a pixel voltage generation circuit 55 for each pixel electrode 33. As illustrated in FIG. 7, the control circuit 51 is provided with a data reception unit 511 and a signal input unit 515.

The data reception unit 511 of the control circuit 51 is configured to communicate with the main computer 70 and receive phase image data from the main computer 70. The phase image data is multiple-value image data that expresses in gradations a spatial distribution of the phase shift amount φ to be realized by the spatial light modulator 30.

This phase image data expresses a value of each pixel by a digital value of predetermined bits corresponding to a gradation count. Each pixel in the phase image data corresponds to each pixel electrode 33 had by the spatial light modulator 30. Hereinbelow, the value of each pixel indicated by the phase image data is also referred to as a gradation value. For example, in phase image data of 256 gradations, each pixel is expressed by a digital value of 8 bits, and the gradation value adopts a value from 0 to 255.

The signal input unit 515 of the control circuit 51 is configured to input the gradation values of each pixel indicated by the phase image data received by the data reception unit 511 to the pixel voltage generation circuits 55 of the corresponding pixels. The signal input unit 515 is configured to further input a timing signal of a predetermined frequency to the pixel voltage generation circuits 55 and the ITO voltage generation circuit 53. The timing signal is a signal for inputting the AC drive signals synchronized from the plurality of pixel voltage generation circuits 55 and the ITO voltage generation circuit 53 to the address unit 32.

The ITO voltage generation circuit 53 generates the AC drive signal for the ITO transparent electrode 37 according to a timing signal input from the control circuit 51. Specifically, the ITO voltage generation circuit 53 generates as the AC drive signal a square wave signal of the constant amplitude voltage Vi whose voltage inverts in a period according to the timing signal and inputs this AC drive signal to the ITO transparent electrode 37.

The pixel voltage generation circuit 55 for each pixel electrode 33 is provided with a DAC 60 and an AC drive signal generation circuit 69. The DAC 60 is a digital/analog converter and converts a gradation value G of a corresponding pixel input from the control circuit 51 into the pixel voltage Vp. Specifically, the DAC 60 operates to convert the gradation value G into the pixel voltage Vp=Vmin+(Vmax−Vmin)·G/M. The value Vmax indicates a maximum output voltage Vmax from the DAC 60, and the value Vmin indicates a minimum output voltage Vmin from the DAC 60. M is an upper limit of the gradation value G. The gradation value G of when it is expressed by N bits adopts values of a range from a minimum value 0 to the maximum value $M=(2^N-1)$.

The AC drive signal generation circuit 69 generates the AC drive signal by inverting the pixel voltage Vp input from the DAC 60 in a predetermined period based on the timing signal from the control circuit 51. This AC drive signal is the square wave signal of the amplitude voltage Vp. The generated AC drive signal is input to the corresponding pixel electrode 33.

Additionally, as illustrated in FIG. 1, the main computer 70 is provided with an operation unit 71, a storage unit 73, and a user interface 75 and is configured so the operation unit 71 executes processing based on a program stored by the storage unit 73. The operation unit 71 functions as, for example, as illustrated in FIG. 7, a phase image data generation unit 711 and a data sending unit 715 by execution of the processing based on the above program.

The phase image data generation unit 711 is configured to, for example, generate phase image data based on information relating to the power spectrum of the input light and a target power spectrum of the light output to outside of the light control system through the output unit 40.

For example, the user interface 75 is provided with input devices such as a pointing device and a keyboard as well as a display for a user. The phase image data generation unit 711 displays on the display a GUI (graphical user interface) screen by which the user can designate the target power spectrum from the input devices and can acquire from the user the information relating to the target power spectrum.

When the power spectrum of the input light is fixed, the phase image data generation unit 711 can generate the phase image data for realizing the target power spectrum based on the information on the power spectrum of the input light and the information acquired above relating to the target power spectrum, which are associated with the program. The phase image data generated by the phase image data generation unit 711 is sent from the data sending unit 715 to the controller 50.

To describe in detail, the phase image data generation unit 711 generates the phase image data so the spatial light modulator 30 functions as the multilevel diffraction grating illustrated in FIG. 8. The multilevel diffraction grating is configured so the light incident thereto from the intermediate optical system 20 is diffracted in the Y-axis direction. That is, the multilevel diffraction grating is configured to indicate a sawtooth-wave shape—specifically, a staircase-wave shape—in the Y-axis direction. A pitch Λ of this multilevel diffraction grating is set based on a wavelength λ, an incidence angle θin, and a target diffraction angle θd of the incident light.

As described above, the plurality of wavelength components included in the input light LI is dispersed in the X-axis direction and becomes incident to the spatial light modulator 30. That is, as illustrated in FIG. 2, at the spatial light modulator 30, each of the plurality of wavelength components becomes incident to regions R[1], R[2], and R[3] that are mutually different in the X-axis direction. Based on the phase image data, for each of these regions R[1], R[2], and R[3], the multilevel diffraction grating of the pitch Λ corresponding to the wavelengths λ, the incidence angles θin, and the target diffraction angles θd of the wavelength components that become incident is configured.

The multilevel diffraction grating illustrated in FIG. 8 is realized by forming in the spatial light modulator 30 a spatial distribution of the phase shift amount φ indicating a sawtooth-wave shape—specifically, a staircase-wave shape—in the Y-axis direction. According to the example illustrated in FIG. 9, a spatial distribution of the phase shift amount φ where the phase shift amount φ changes in a staircase shape from zero to 2π is repeatedly formed in the Y-axis direction at the pitch Λ, which corresponds to the target diffraction angle θd. The target diffraction angle θd is adjusted by a gradient 2π/Λ of the phase shift amount φ changing by a control of the pitch Λ. The bold line segments illustrated in FIG. 9 each correspond to one pixel. In FIG. 9, the phase shift amount φ realized by each pixel is discretely indicated.

FIG. 10 illustrates by a graph a relationship between the pixel voltage Vp and the phase shift amount φ that arises in the light that passes through the corresponding pixel region of the liquid-crystal layer 35 by the pixel voltage Vp. As can be understood from this graph as well, there is a substantially proportional relationship between the pixel voltage Vp and the phase shift amount φ.

Therefore, to form the spatial distribution of the phase shift amount φ illustrated in FIG. 9, it is sufficient to incrementally apply in the Y-axis direction the pixel voltages Vp corresponding to the phase shift amounts φ=0 to 2π to an array of the pixel electrodes 33 in the Y-axis direction. This signifies that to form the multilevel diffraction grating illustrated in FIG. 8, it is sufficient to generate phase image data incrementally describing in the Y-axis direction the gradient values G corresponding to the phase shift amounts φ=0 to 2π for a pixel array in the Y-axis direction.

When a pixel size of the spatial light modulator 30 is represented by D, a multilevel count is represented by Q, the wavelength of the incident light is represented by λ, and the incidence angle is represented by θin, the diffraction angle θd and a diffraction efficiency η can be expressed by the following approximation. Here, it is supposed that θ is sufficiently small, and sin θ is approximated as θ. The pixel size D may be understood as a disposition interval of the pixel electrodes 33 in the Y-axis direction. m is a diffraction order.

$$\theta in+\theta d=m\cdot\lambda/\Lambda$$

$$\eta=\{\sin(\pi/Q)/(\pi/Q)\}^2$$

$$\Lambda=D\cdot Q$$

By controlling the pitch Λ in this manner, the gradient of the multilevel diffraction grating is controlled, and as a result, the diffraction angle θd is controlled.

As illustrated in FIG. 11, change in the diffraction angle θd gives rise to change in a positional relationship of the diffracted light to the output unit 40 and as a result gives rise to change in the intensity of the diffracted light output to outside of the light control system from the output unit 40.

That is, by adjustment of the pitch Λ for each region R[1], R[2], and R[3] corresponding to each wavelength component, an incidence ratio of the diffracted lights of each wavelength component to the output unit 40 can be adjusted. As a result, an output intensity for each wavelength component of the input light can be adjusted.

A correspondence relationship between a ratio of the light output to outside of the light control system from the output unit 40 to the input light and the pitch Λ is established in advance for each wavelength component by a structure of the optical system. A designer can derive this correspondence relationship by testing and configure a program for generating the phase image data from a comparison between the power spectrum of the input light and the power spectrum of the output light.

The output unit 40 is configured by, for example, optical fibers. The output unit 40 may be an optical system that guides to an external irradiation target the light arriving from the spatial light modulator 30 through the intermediate optical system 20.

In other words, with the multilevel diffraction grating, a diffracted light of a high order other than a zero-order diffracted light can be made to arise. Meanwhile, light that is not controlled that does not become incident to the liquid-crystal layer 35 and is reflected is zero-order diffracted light. Because of this, the output unit 40 may be disposed in a position to which a diffracted light of a high order other than zero orders becomes incident. According to this disposition, an extinction ratio is significantly improved.

The light control system 1 according to one or more embodiments described above causes the spatial light modulator 30 to function as the multilevel diffraction grating, controls the path of the diffracted light by shape change of the diffraction grating, and thereby controls the output intensity of the light from the output unit 40. Here, the diffraction angle θd is a function of the pitch Λ of the multilevel diffraction grating—that is, a phase period—and has low wavelength dependency compared to the conventional technology described above where light intensity and a polarization state are functions of a liquid-crystal voltage. As a result, according to the light control system 1 according to one or more embodiments, the output intensity of the light can be controlled at a high resolution over a wide frequency band.

Particularly, according to one or more embodiments, the input light from the input unit 10 is converted into the spectrum light and the pitch Λ is controlled for each wavelength component to control the diffraction angle θd. Control of the diffraction angle θd for each wavelength component enables control of the output intensity for each wavelength component. Therefore, according to this light control system 1, the light from the input unit 10 can be converted into many types of output lights of different power spectra, which is very useful as a programmable variable light source.

According to the example illustrated in FIG. 3, only a partial wavelength component of the light from the input unit 10 is output to outside of the light control system from the output unit 40, but this light control system 1 can control the diffraction angle θd for each wavelength component so all wavelength components are output to outside of the light control system from the output unit 40. The light control system 1 can also uniformly or non-uniformly modulate the intensity of all wavelength components of the light from the input unit 10 and output the light to outside of the light control system from the output unit 40.

While obvious, the optical path illustrated by the arrows in FIG. 1, FIG. 2, FIG. 3, FIG. 8, and FIG. 11 is but a simple expression of a conceptual optical path. The input light LI can be separated into many wavelength components of three or more and, after having the intensity adjusted for each component, output from the output unit 40.

[First Modified Example]

As illustrated in FIG. 12, a light control system 2 of a first modified example is configured as a light control system provided with a plurality of output units 401, 402, and 403 for one input unit 10. This light control system 2 differs from the light control system 1 above according to one or more embodiments in being provided with the plurality of output units 401, 402, and 403 of different dispositions but otherwise matches the light control system 1. In FIG. 12, areas labeled with the same reference signs as the light control system 1 may be understood to be configuration areas identical to the light control system 1.

The controller 50 controls the spatial light modulator 30 based on the phase image data so each diffracted light from the spatial light modulator 30 corresponding to a plurality of wavelength components LC had by the input light LI is input to a specified output unit among the plurality of output units 401, 402, and 403. The phase image data is generated by the main computer 70 as data that can realize this control.

The specified output unit above can be a plurality of output units. That is, a diffracted light of one certain wavelength component may be input to two or more among the output units 401, 402, and 403. A diffracted light of two or more wavelength components may be input to one output unit. The light control system 2 of the first modified example can generate a plurality of lights of different power spectra from a single light source and is very useful as a variable light source with a high degree of freedom.

[Second Modified Example]

As illustrated in FIG. 13, a light control system 3 of a second modified example is made to be a configuration where a plurality of pairs of the input unit 10 and the output unit 40 is disposed to a common diffraction grating 21 and spatial light modulator 30.

To describe in detail, the light control system 3 is made to be a configuration provided with the plurality of pairs of the input unit 10 and the output unit 40, the diffraction grating 21 in common with this plurality of pairs, aspherical lenses 25 corresponding to each of this plurality of pairs, the spatial light modulator 30 in common with this plurality of pairs, the controller 50, and the main computer 70. In FIG. 13, areas labeled with the same reference signs as the light control system 1 may be understood to be configuration areas identical to the light control system 1.

The controller 50 controls the spatial light modulator 30 based on the phase image data so diffracted lights LE from the spatial light modulator 30 corresponding to the input lights LI from each input unit 10 are input to specified output units 40 configuring a pair among the plurality of output units 40. At this time, the controller 50 can control amounts of the diffracted lights LE incident to the output units. The phase image data is generated by the main computer 70 as data that can realize this control.

According to the light control system 3 of the second modified example, lights from a plurality of light sources can be controlled using a single spatial light modulator 30, which is very convenient and also beneficial in terms of cost.

[Other Embodiments]

The present disclosure is not limited to the above embodiments including the first and second modified example and can adopt various aspects.

For example, the light control system 1 may provide a plurality of input units 10 to a single output unit 40 and may be configured to synthesize input lights from a plurality of light sources to be output to outside of the light control system from the output unit 40.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1, 2, 3 . . . light control system; 10 . . . input unit; 20 . . . intermediate optical system; 21 . . . diffraction grating;

25 . . . aspherical lens; 30 . . . spatial light modulator; 31 . . . silicon substrate; 32 . . . address unit; 33 . . . pixel electrode; 34, 36 . . . orientation layer; 35 . . . liquid-crystal layer; 37 . . . ITO transparent electrode; 39 . . . glass substrate; 40, 401, 402, 403 . . . output unit; 50 . . . controller; 51 . . . control circuit; 53 . . . ITO voltage generation circuit; 55 . . . pixel voltage generation circuit; 60 . . . DAC; 69 . . . AC drive signal generation circuit; 70 . . . main computer; 71 . . . operation unit; 73 . . . storage unit; 75 . . . user interface; 511 . . . data reception unit; 515 . . . signal input unit; 711 . . . phase image data generation unit; 715 . . . data sending unit.

The invention claimed is:

1. A light control system, comprising:
a spatial light modulator of a liquid-crystal type;
a light source that inputs light to the spatial light modulator; and
a controller that electrically controls the spatial light modulator to function as a diffraction grating;
wherein
the controller changes a path of a diffracted light from the spatial light modulator corresponding to the light input from the light source by changing a shape of the diffraction grating.

2. The light control system according to claim 1, wherein the diffraction grating is a multilevel diffraction grating, and
the controller changes the path of the diffracted light by a change of a gradient of the multilevel diffraction grating.

3. The light control system according to claim 2, wherein the spatial light modulator comprises a liquid crystal and a plurality of electrodes arranged along a surface of the liquid crystal and performs phase modulation of the light input from the light source by applying individual voltages to the liquid crystal from each of the plurality of electrodes, and
the controller
causes the spatial light modulator to function as the multilevel diffraction grating by controlling voltages input to the plurality of electrodes so a phase shift amount indicates a sawtooth-wave shape in an arrangement direction of the electrodes corresponding to a diffraction direction and
changes the gradient of the multilevel diffraction grating by changing a gradient of the phase shift amount.

4. The light control system according to claim 1, wherein the spatial light modulator is a spatial light modulator of an LCOS type.

5. The light control system according to claim 1, wherein the controller adjusts an amount of the diffracted light incident to a target by changing the path of the diffracted light.

6. The light control system according to claim 5, further comprising an optical fiber that outputs the diffracted light to outside of the light control system, wherein the optical fiber is the target.

7. The light control system according to claim 6, wherein the optical fiber is disposed in a position to which a zero-order diffracted light does not become incident.

8. The light control system according to claim 5, further comprising: a dispersion unit that comprises a diffraction grating and a lens and that inputs the light input from the light source to the spatial light modulator as a spectrum light by dispersing a plurality of wavelength components included in the light input from the light source;
wherein
the controller, by changing respective paths of diffracted lights corresponding to the plurality of wavelength components, adjusts respective amounts at which the diffracted lights are incident to the target.

9. The light control system according to claim 1, further comprising:
a dispersion unit that comprises a diffraction grating and a lens and that inputs the light input from the light source to the spatial light modulator as a spectrum light by dispersing a plurality of wavelength components included in the light input from the light source; and
a plurality of optical fibers that output diffracted lights from the spatial light modulator corresponding to the plurality of wavelength components to outside of the light control system;
wherein
the controller controls the spatial light modulator so each of the diffracted lights from the spatial light modulator corresponding to the plurality of wavelength components is input to a specified one of the optical fibers.

10. The light control system according to claim 1, further comprising:
a plurality of light sources as the light source; and
a plurality of optical fibers that output diffracted lights from the spatial light modulator corresponding to lights input from the plurality of light sources to outside of the light control system, and
the controller controls the spatial light modulator so each of the diffracted lights from the spatial light modulator corresponding to the lights input from the plurality of light sources is input to a specified one of the optical fibers.

11. The light control system according to claim 9, wherein the controller, by changing respective paths of the diffracted lights, adjusts respective amounts at which the diffracted lights are incident to the specified output units.

* * * * *